(12) United States Patent
Collins

(10) Patent No.: US 9,504,261 B1
(45) Date of Patent: Nov. 29, 2016

(54) METHOD AND APPARATUS USEFUL IN FIELD DRESSING GAME ANIMALS

(71) Applicant: Joseph Wayne Collins, Charleston, WV (US)

(72) Inventor: Joseph Wayne Collins, Charleston, WV (US)

(*) Notice: Subject to any disclaimer, the term of this patent is extended or adjusted under 35 U.S.C. 154(b) by 0 days.

(21) Appl. No.: 14/971,628

(22) Filed: Dec. 16, 2015

Related U.S. Application Data

(60) Provisional application No. 62/092,862, filed on Dec. 17, 2014.

(51) Int. Cl.
*A22B 5/00* (2006.01)

(52) U.S. Cl.
CPC ................ *A22B 5/0094* (2013.01)

(58) Field of Classification Search
CPC .... A22C 21/063; A01K 97/14; A01K 97/18; A01K 83/02
USPC ...... 452/117, 120, 122, 126; 43/5, 6, 34–37; 294/15–24, 26, 82.1, 191, 87.1
See application file for complete search history.

(56) References Cited

U.S. PATENT DOCUMENTS

| | | | |
|---|---|---|---|
| 2,108,921 A | 2/1938 | McKim | |
| 3,574,265 A * | 4/1971 | Gibbons | A01K 85/16 43/35 |
| 5,123,871 A | 6/1992 | van den Nieuwelaar et al. | |
| 5,688,164 A * | 11/1997 | Mills | A22B 5/0094 452/122 |
| 5,878,524 A * | 3/1999 | Braden | A01K 85/02 43/35 |
| 6,210,263 B1 | 4/2001 | Meyer | |
| 6,244,949 B1 * | 6/2001 | Moody | A22B 5/0094 452/122 |
| 6,598,298 B1 * | 7/2003 | Bartlett | A22B 3/10 30/136 |
| 6,641,475 B1 * | 11/2003 | Nielsen | A22B 5/18 452/109 |
| 7,367,877 B1 | 5/2008 | Luster | |
| 7,597,614 B2 | 10/2009 | Forbes | |
| D684,659 S | 6/2013 | Quill | |
| 2010/0323598 A1 | 12/2010 | Lowell | |

* cited by examiner

*Primary Examiner* — Richard Price, Jr.
(74) *Attorney, Agent, or Firm* — Dinsmore & Shohl LLP; Monika L. Jaensson, Esq.

(57) ABSTRACT

An apparatus useful in removing internal organs from a game animal, and a method of field dressing an animal. The apparatus includes, generally, a pair of tubes, slidably engaged one within the other, with a hook structure removably affixed to the end of the inner tube. The position of the tubes relative to one-another is controlled by longitudinal and latitudinal channels extending along one of the tubes, and a protuberance formed on the other tube. The associated method for removing internal organs from a game animal using the disclosed apparatus includes inserting the apparatus into the anus of a game animal, securing the hook to the flesh of the animal, cutting around the anus, and pulling back the internal tube so that the anal tract is locked within the proximal end of the external tube.

12 Claims, 4 Drawing Sheets

METHOD AND APPARATUS USEFUL IN FIELD DRESSING GAME ANIMALS

BACKGROUND

This invention relates to a method and apparatus for removing internal organs from game animal, such as a deer.

Hunters in the process of field dressing game animals have to remove the anus and anal tract. This operation may be performed with a knife or other cutting tools. However, present tools frequently result in breakage of the intestines and leakage of excrement, resulting in contamination of the meat. The disclosed technology is a sealed system tool that helps to avoid breakage or leakage of the intestines and facilitates clean removal of the anus and anal tract from the deer with other internal organs. Specifically, the disclosed technology may be used without having to cut into the pelvis or the anus of the deer, risking causing excrement to contaminate the deer meat.

GENERAL DESCRIPTION

The disclosed technology is an apparatus for removing internal organs from a game animal, and a method of field dressing an animal. The apparatus includes, generally, a receiving tube having a hollow core and an internal tube slidably engaged within the hollow core of the receiving tube. A hook structure is affixed to the distal end of the internal tube. In some embodiments the receiving tube has a linear channel extending along a portion of the length and through the wall of the receiving tube, from the proximal end, and one or tributary channels extend through the wall of the receiving tube, perpendicular to the linear channel. The internal tube has a protuberance affixed to or formed on the surface of the internal tube, which is sized, configured and positioned to be received in the channels of the receiving tube. By means of the protuberance and channels, the position of the internal tube relative to the receiving tube, and the position of the hook structure relative to the receiving tube (inside or outside of the receiving tube) can be controlled and maintained.

The disclosed technology also regards a method for removing internal organs from a game animal using the described apparatus, wherein the apparatus is inserted into the anus of a game animal, the interior tube is pushed into the receiving tube so that the hook is exposed and cuts into the deer flesh, the flesh surrounding the anus is cut, and the internal tube is pulled back a portion relative to the receiving tube, so that the hook and the anal tract of the deer is locked within the distal end of the receiving tube.

DETAILED DESCRIPTION

Figure 1:
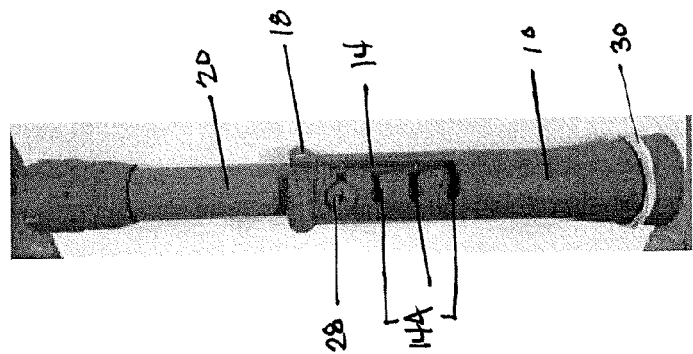
FIG. 1 depicts an embodiment of the apparatus of the disclosed technology, assembled.
Figure 2:
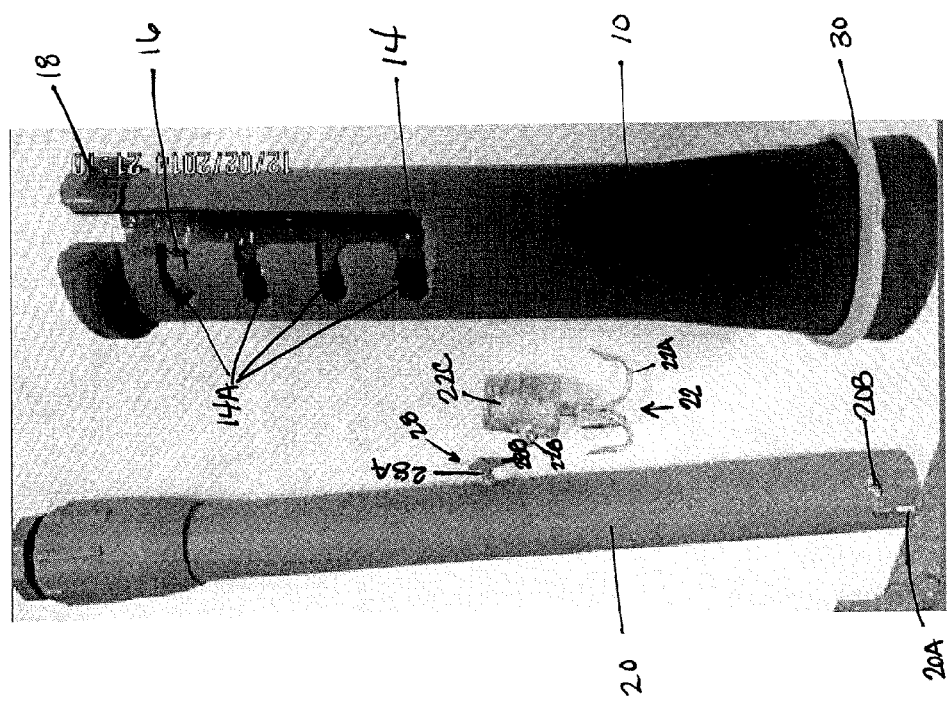
FIG. 2 depicts an embodiment of the apparatus of the disclosed technology, with components separated.
Figure 3:
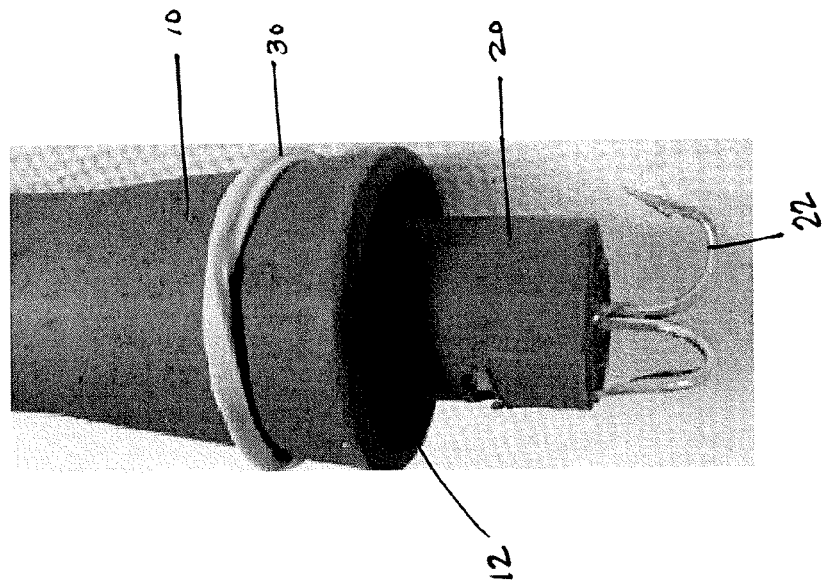
FIG. 3 depicts the distal end of an embodiment of the apparatus of the disclosed technology, with the hook exposed.

As shown in the Figures, the disclosed technology includes a receiving tube 10, and an internal tube 20 slidably engaged within the hollow core of the receiving tube. An elastic band 30 may be provided with the apparatus of the disclosed technology.

The receiving tube 10 has a hollow core 12 to receive the internal tube 20. The distal end of the receiving tube 10 is flared to receive the deer anus as hereinafter described. In some embodiments the receiving tube 10 has a recessed annular groove at the flared end to receive the band 30.

The receiving tube 10 may have a linear channel 14 extending through the wall of the tube. The linear channel 14 extends from the proximal end of the receiving tube, along a portion of its length. One or more tributary channels 14A likewise extend through the wall of the receiving tube, from and perpendicular to the linear channel 14. A neck 16 may be formed where each tributary channel connects with the linear channel. The channel and tributary channel(s) are sized to receive a protuberance 28 affixed to or formed on the internal tube 20, when the same is received in the receiving tube. By the linear channel 14, the tributary channel(s) 14A and the protuberance 28, positioning of the internal tube 20 within the receiving tube 10 can be controlled. Springs may be incorporated into the proximal end of the receiving tube 10 to provide tension when the protuberance is within a tributary channel, thereby holding the internal tube in a position within the receiving tube. Alternatively or additionally, the neck 16 of the tributary channels may be sized at or slightly smaller than the diameter of the protuberance body, so that force is required to pass the protuberance into and out of the tributary channel.

The proximal end of the receiving tube 10 may comprise a collar 18, sized and configured to receive the body of the internal tube, and externally support the proximal end of the internal tube 20. In some embodiments the interior of the collar 18 is flared, to support a portion of the proximal end of the internal tube having a corresponding flared contour.

The internal tube 20 may be hollow or solid. The proximal end of the internal tube 20 may have a flared or cylindrical increased circumference, to provide the user with support and to maintain the proximal end of the tube 20 external to the core of the receiving tube 10. A protuberance 28 extends from the surface of the tube, near or at its mid section. The protuberance 28 is sized and configured to allow it to pass through the linear channel 14 and the tributary channels 14A of the receiving tube 10. By the protuberance 28, and the channels 14, 14A, movement of the internal tube 20 relative to and within the hollow core 12 of the receiving tube 10, is guided and controlled. In some embodiments the protuberance 28 has a body 28A, sized to be accommodated within the channels 14, 14A, and a head 28B to extend beyond the channels and above the top surface of the receiving tube.

The internal tube 20 includes a hook 22 at its distal end. In some embodiments the hook 22 is a treble hook, having three prongs 22A. The prongs 22A may or may not have barbs, and each prong has a tapered end sufficient to cut into the flesh of an animal. The outside diameter of the pronged hook 22 is smaller than the hollow core 12 of the receiving tube 10 so that it may easily pass through the tube in assembly and use of the apparatus. In some embodiments the hook 22 comprises a cylinder 22C which may be removably affixed to the distal end of the internal tube 20 by means of a protuberance 22B, extending radially from a wall of the cylinder, and corresponding linear channel 20A and tributary channel 20B extending through the walls of a hollowed portion of the internal tube 20, at its distal end. A spring may be incorporated within the internal tube, near the distal end, to provide tension and hold the protuberance 22B within the tributary channel 20B. In another embodiment, the cylinder 22C may be removably secured within the internal tube by means of a locking pin, wherein corresponding apertures in the cylinder and the internal tube are configured and positioned to receive the locking pin and retain the cylinder 22C within the internal tube 20.

Figure 4:
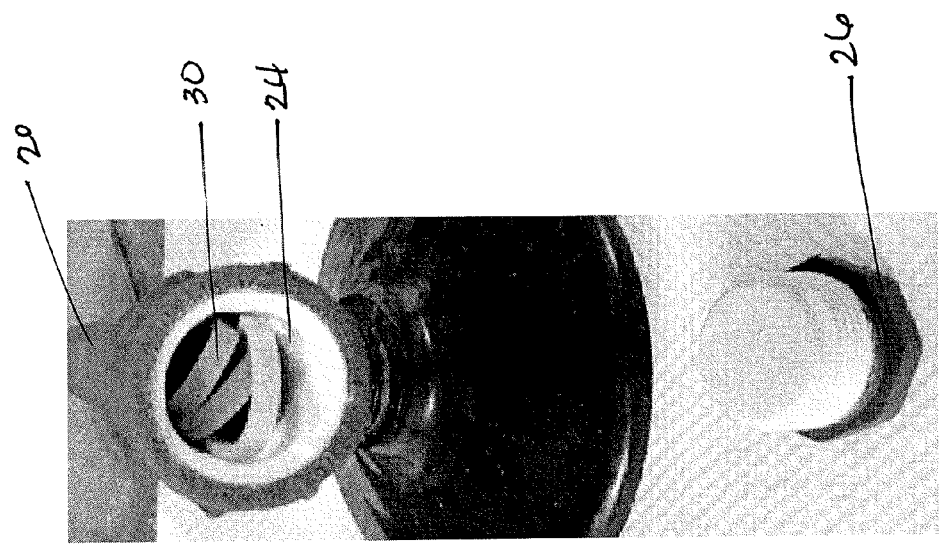
FIG. 4 is an end view of an embodiment of the cavity of the internal tube of the disclosed technology.

As shown in FIG. 4, the internal tube 20 may have a cavity 24 at its proximal end, to receive and store bands 30. The cavity may have threaded walls, and be sealed by a screw top 26 with a body correspondingly threaded to secure the top to the cavity.

In practice, an embodiment of the device of the disclosed technology is assembled by securing the hook 22 to the proximal end of the internal tube 20, by for example inserting the protuberance 22B into the channels 20A, 20B, respectively, or by inserting the locking pin within apertures of each of the cylinder and the tube. The internal tube with hook attached is then inserted into the receiving tube 10, with the protuberance 28 of the internal tube passing through the linear channel 14, and into a tributary channel 14A so that the hook 22 is within the receiving tube 10.

The receiving tube 10 of the assembled device is then inserted into the anus of a deer or other animal, and the internal tube is pushed further into the receiving tube so that the hook is exposed and cuts into the deer flesh (anal tract); exposure of the hook and rotation of the internal tube relative to the receiving tube is allowed and controlled by linear channel 14 and tributary channels 14A. Once the hook is firmly fastened within the deer, the flesh surrounding the anus may be cut, and the internal tube and hook are pulled back relative to the receiving tube, with the protuberance 28 moving into another tributary channel 14A, so that the end of the anal tract is locked within the distal, flared end of the receiving tube 10. A band 30 may secured about the exposed anal tract. The device may then be pushed into the internal cavity of the deer, and removed with the internal organs. By this device the risk of contamination of meat from leakage of the anal tract during field dressing of an animal is minimized.

While particular embodiments of the present invention have been illustrated and described, it would be obvious to one skilled in the art that various other changes and modifications can be made without departing from the spirit and scope of the invention. It is therefore intended to cover in the appended claims all such changes and modifications that are within the scope of this invention.

The invention claimed is:

1. An apparatus for removing internal organs from a game animal, the apparatus comprising:
   a. a receiving tube having walls defining a hollow core, and a length terminating at proximal and distal ends, wherein the receiving tube comprises:
      i. a linear channel extending along a portion of the length and through the wall of the receiving tube, from the proximal end, and
      ii. one or tributary channels extending through the wall of the receiving tube, perpendicular to the linear channel, and
   b. an internal tube slidably engaged within the hollow core of the receiving tube, the internal tube having a body with proximal and distal ends and comprising a hook at the distal end of the tube, wherein the internal tube further comprises a protuberance on a surface of the internal tube; and wherein the linear channel and the tributary channels are sized, configured and positioned to receive the protuberance when the internal tube is slidably engaged within the receiving tube.

2. The apparatus of claim 1, wherein a distal end of the receiving tube is flared.

3. The apparatus of claim 1, wherein the protuberance comprises a body sized to be accommodated within the channels, and a head to extend beyond the channels and above the wall of the receiving tube when the internal tube is slidably engaged within the receiving tube.

4. The apparatus of claim 1, wherein the hook is a treble hook.

5. The apparatus of claim 4, wherein the hook comprises a cylinder to facilitate removable affixation of the hook to the body of the internal tube.

6. The apparatus of claim 1, wherein the internal tube comprises a cavity at its proximal end.

7. A method for removing internal organs from a game animal, the method using an apparatus comprising a receiving tube having a hollow core and an internal tube slidably engaged within the hollow core of the receiving tube, the internal tube comprising a hook at its distal end and a protuberance on a surface of the internal tube, and the receiving tube comprising a linear channel extending along a portion of its length and through its wall, from its proximal end, and one or tributary channels extending through the wall of the receiving tube, perpendicular to the linear channel, and wherein the channels are sized, configured and positioned to receive the protuberance, the method comprising the steps of:
   a. inserting the apparatus into the anus of the animal,
   b. pushing the interior tube into the receiving tube so that the hook is exposed and cuts into the flesh of the animal,
   c. cutting the flesh surrounding the anus, and
   d. pulling the internal tube back a portion of the length of the receiving tube so that the anal tract is locked within the distal end of the receiving tube.

8. The method of claim 7, wherein the hook is a treble hook.

9. The method of claim 8, wherein the hook comprises a cylinder removably engaged with the distal end of the internal tube.

10. The method of claim 8, wherein the cylinder and the internal tube comprise corresponding apertures configured and positioned to receive a locking pin.

11. An apparatus for removing internal organs from a game animal, the apparatus comprising:
   a. a receiving tube having walls defining a hollow core, and a length terminating at proximal and distal ends, and
   b. an internal tube slidably engaged within the hollow core of the receiving tube, the internal tube having a body with proximal and distal ends and comprising a hook at the distal end of the tube, wherein the proximal end of the receiving tube comprises a collar, sized and configured to receive the body of the internal tube, and support the proximal end of the internal tube, external to the proximal end of the receiving tube.

12. The apparatus of claim 11, wherein the proximal end of the internal tube and the interior of the collar are correspondingly flared so that a portion of the proximal end of the internal tube rests upon an interior surface of the collar.

* * * * *